June 16, 1959     R. P. CROW     2,891,156
DETECTOR CIRCUIT

Filed July 25, 1956     2 Sheets-Sheet 1

INVENTOR.
Robert P. Crow
BY Mueller & Aichele
Attys.

United States Patent Office 2,891,156
Patented June 16, 1959

2,891,156

DETECTOR CIRCUIT

Robert P. Crow, Park Ridge, Ill., assignor to Motorola, Inc., Chicago, Ill., a corporation of Illinois Application July 25, 1956, Serial No. 600,087

7 Claims. (Cl. 250—31)

This invention relates to electronic signal detector circuits and more particularly to frequency selective detectors which use transistors.

In various types of wave signal apparatus it may be desired to provide a response which distinguishes between or compares a signal of given frequency and signals or energy adjacent thereto in the spectrum. For example, a differential detector can produce an output the polarity of which is determined by the relationship between a given applied signal and other signals or noise adjacent to the applied signal. In a generally comparable manner the output of a frequency modulation (FM) detector varies as the modulation energy of the carrier appears on either side of the carrier frequency. In the past many detector or comparison circuits of the above type which are highly selective and capable of rejecting undesired adjacent signals have been of relatively complicated and expensive construction.

Accordingly, it is an object of this invention to provide a simple transistor detector circuit which has good selectivity characteristics and ability to reject adjacent signals.

Another object of the invention is to provide a differential detector having a very narrow response band to effect a high degree of security against false operation from undesired signals.

Another object is to provide a detector circuit which is responsive only to a given carrier signal and which is unresponsive to spurious or off frequency signals, regardless of the strength thereof.

A further object is to provide a transistorized FM detector or discriminator which exhibits less temperature responsiveness than would most detectors of known construction.

A feature of the invention is the provision of an improved detector including a transistor with input circuits coupled between the base and emitter and between the base and collector of the transistor and an output circuit coupled in the emitter-collector path so that signals from one input circuit tend to develop a voltage of one polarity across the output circuit and signals from the other input circuit tend to develop a voltage of opposite polarity thereacross, with the net difference being available for utilization.

A further feature of the invention is the provision of a transistor differential selectivity detector with input circuits respectively coupled between the base and collector and between the base and emitter of the transistor, and wherein one of the input circuits includes relatively broad band impedance elements and the other includes relatively narrow band elements and the emitter-collector circuit path includes a polar responsive device energizable according to the amplitude different of the detected narrow band signal over the broad band signal.

Still another feature is the provision of a transistorized FM detector with a series tuned circuit in the input and one element of the tuned circuit coupled across the base and collector of the transistor and the other element coupled across the base and emitter and an output circuit in the emitter-collector branch to recover the difference between conduction caused by FM signals in the tuned circuit elements.

Further objects and features and attending advantages of the invention will be apparent upon consideration of the following description when taken in conjunction with the accompanying drawings in which.

The invention provides a detector, using a single transistor. One input signal is applied between the base and emitter of the transistor so that this signal will be detected and tend to cause unidirectional current flow to the collector electrode of the transistor. A second input signal is applied between the base and collector electrode and this signal is detected and tends to cause unidirectional current flow in the opposite direction to the emitter electrode. A load impedance in the emitter-collector circuit is used to derive the difference between the two currents and a voltage so produced can be used, for example, to operate a control circuit. By constructing the input circuits with particular characteristics the apparatus may be made very selective and responsive only to a particular relationship between input signals. As an example, one input circuit can be an impedance which develops broad band noise and spurious signals and the other input circuit can comprise a tuned circuit responsive to a desired signal to form a differential detector operative in response to the desired signal and providing a high degree of security, or protection against false operation. The input may also be a tuned circuit with different elements coupled across emitter-base and collector-base providing a slope characteristic so that FM may be demodulated.

Figure 1:
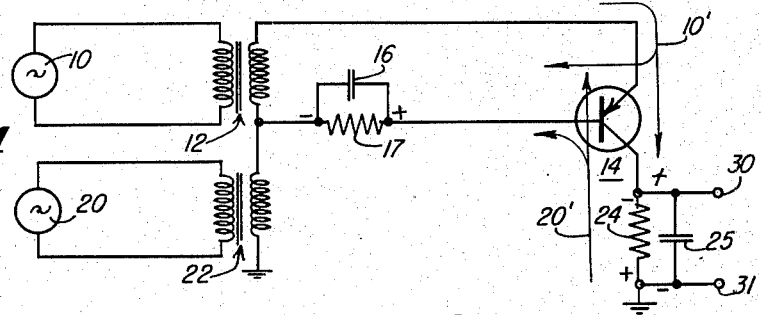
Fig. 1 is a schematic diagram of the basic form of the detector circuit.

In a basic form of the invention shown in Fig. 1, the source of signals 10 is coupled through transformer 12 to the emitter and base of transistor 14. In the base circuit there is a parallel connected bias network, capacitor 16 and resistor 17. A further signal source 20 is coupled by way of transformer 22 across the base and collector electrodes of transistor 14. This signal is applied to the base through the biasing network 16, 17 and through the output impedance comprising parallel connected resistor 24 and capacitor 25. Capacitors 16 and 25 comprise bypass paths at signal frequencies and resistor 17 develops a bias for the transistor. Resistor 24 is the load impedance for the circuit across which terminals 30, 31 are coupled for deriving an output voltage from the detector circuit.

The operation of the circuit may be understood by considering the effects of signals separately applied from sources 10 and 20. If source 10 is operative, emitter current will flow only during the half cycles when the emitter is positive with respect to the base and collector. This rectified current designated 10' will flow from the emitter to both the base and collector to produce approximately equal voltage drops across resistors 17 and 24, the collector and base terminals of the resistors being positive. The voltage across resistor 17 is necessary to provide proper collector potential with respect to the base. The drop across load resistor 24 bucks this potential to the point where the collector-to-base voltage is approximately zero and transistor action ceases. Capacitors 16 and 25 bypass signal frequency components and provide filtering action for these currents. Thus, a positive-to-negative D.C. voltage will be had across output terminals 30 and 31 respectively.

Because of the fairly symmetrical characteristics of transistors, the emitter and collector can be reversed with similar operation. With signal source 20 operative, then, current will flow on the portion of each cycle that the collector is positive with respect to the base and emitter. This rectified current, designated 20', will flow to the other two elements, as in the former case, causing voltage drops in resistors 17 and 24. However, in this case because of the different positions of signal source and load resistance 24 with respect to each other, the voltage drop across 24 is reversed, with terminal 30 negative and terminal 31 positive. The polarity of voltage across resistor 17 and capacitor 16 remains the same as in the former case, positive terminal at the transistor base. It can be seen, then, that the resultant voltage across load resistance 24 is the net difference between currents developed by the signal sources 10 and 20.

The relationship between the signals supplied by sources 10 and 20 at which zero voltage exists across terminals 30, 31, is determined by the relationship between components such as resistors 17 and 24, and the sizes of the signals coupled into the circuit by transformers 12 and 22. It may be noted, that the circuit relies on the reversible or bi-directional conduction characteristics of a transistor and that a transistor device with symmetrical properties of each element with respect to the base may be used in a given application of the circuit. However, it should also be apparent that a standard device of somewhat unsymmetrical characteristics could also be used and further that the current flows and potentials described would all be reversed if a transistor of the n-p-n type were used instead of one of the p-n-p type as shown in Fig. 1.

Figure 2:
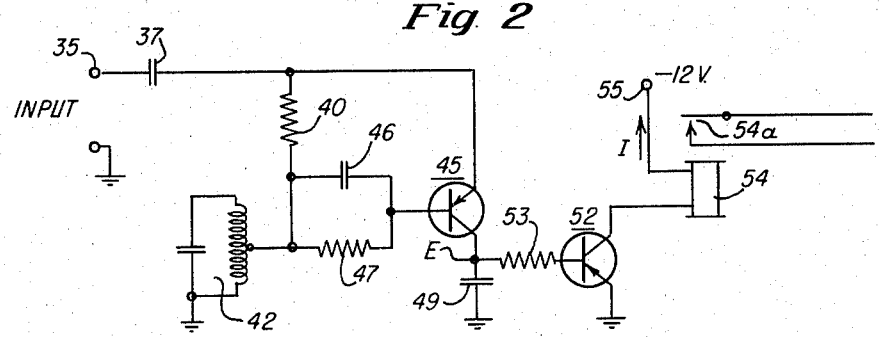
Fig. 2 is a schematic diagram of a particular embodiment of the detector circuit.

Fig. 2 shows a practical application of the circuit to provide a sharp differential response to a signal applied thereto within a very narrow band width. Input signals are applied to terminal 35 with respect to ground and these are coupled through blocking capacitor 37 to a series connection of first input element 40 and second input network 42. Network 42 comprises a parallel connected capacitor-inductor arrangement which is resonant at the frequency of the signal to which the circuit is to be responsive to apply this signal between base and collector circuit of transistor 45. Element 40 is a resistor which forms a broad band impedance element across which undesired signals of frequencies other than the desired signal are developed to be applied between base and emitter of transistor 45. It may be noted that one side of resistor 40 is connected to a tap point on the inductor of network 42 to provide impedance matching of this network with respect to the base-collector circuit of transistor 45. This tap point is connected through a parallel combination of bypass capacitor 46 and bias resistor 47 to the base of transistor 45 and one side of the parallel connected network 42 is coupled to ground. The emitter of the transistor is connected to the junction of capacitor 37 and input element 40. The collector electrode of the transistor is bypassed to ground at signal frequencies by means of capacitor 49.

A direct current amplifier is connected across capacitor 49 and this amplifier responds to a voltage of given polarity developed by the differential detector circuit. The amplifier includes a transistor 52 with the base thereof connected through resistor 53 to the collector of transistor 45 and an emitter electrode connected to the ground. Accordingly, the series combination of the base-emitter resistance of transistor 52 and resistor 53 comprises a load for the differential detector circuit including transistor 45, which operates in the same manner as the circuit of Fig. 1. The collector electrode of transistor 52 is connected through a relay 54 to a source of negative potential (with respect to ground) at terminal 55. Suitable contacts 54a of the relay may be connected to any apparatus which is to be responsive upon reception of the desired signal.

Figure 3:
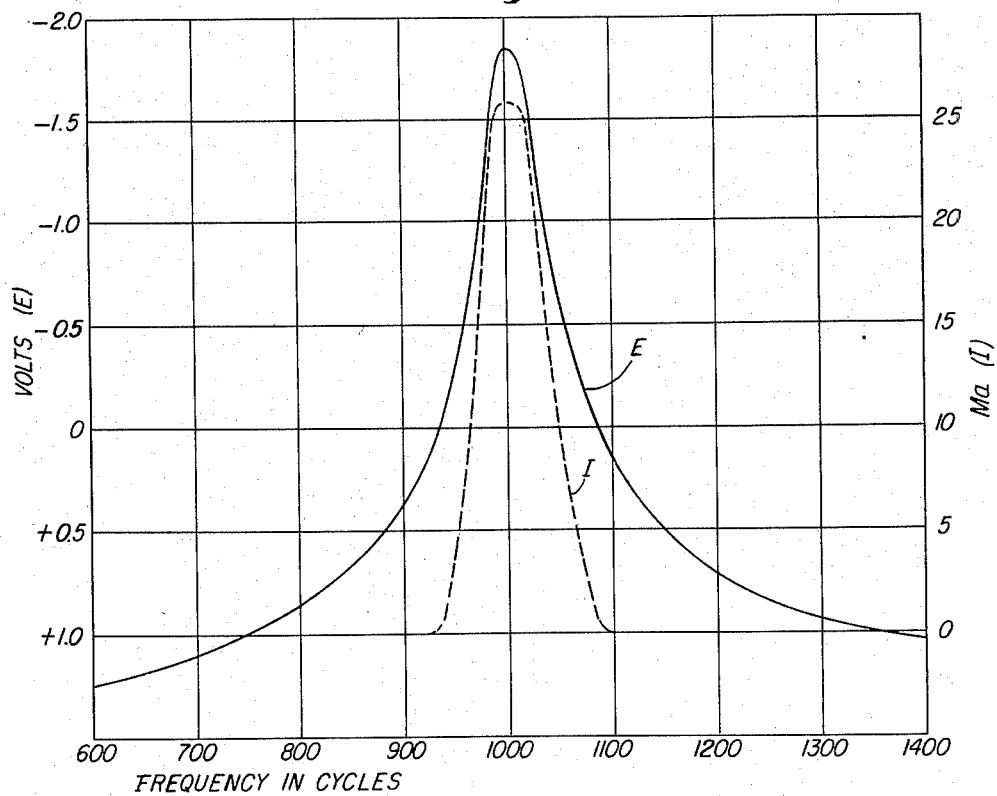
Fig. 3 is a graph useful in explaining the characteristics of the circuit of Fig. 2.

Fig. 3 is a graph of the response of the circuit of Fig. 2 and shows the sharp frequency responsive characteristics of the circuit when designed to operate upon reception of a signal of approximately 1010 cycles per second. Curve E in the diagram represents the voltage appearing across capacitor 49 in the circuit and curve I represents the current flow through the coil of relay 54 with respect to the frequency of signals applied to terminal 35. It may be noted that the polarity of voltage E changes sign at approximately 75 cycles each side of the on-frequency signal and that all signals outside of this frequency range tend to produce a positive voltage to which the circuit will not respond. However, within the narrow frequency range, wherein voltage E is negative, current flow will be produced in transistor 52 through the emitter collector circuit thereof tending to cause operation of relay 54. In the circuit shown it is contemplated that relay 54 operated with 15 milliamperes of current flowing and it may be noted that the actual frequency range of operation is 1010±30 cycles per second. The circuit therefore furnishes a very narrow response bandwidth to provide great selectivity and a high degree of security against false operation from even relatively close interfering signals and noise. Such a system has operated on the output of a receiver with no false operation in the presence of voice and music, and yet reliably operates when only the proper tone is received.

The values of the various components which may be used in a practical construction of the circuit of Fig. 2 are as follows:

| | |
|---|---|
| Capacitor 37 | 25 microfarads. |
| Resistor 40 | 680 ohms. |
| Network 42 | Capacitor of .025 microfarad and inductor of 1 henry with the tap 11.5 percent from the bottom thereof. |
| Capacitor 46 | 25 microfarads. |
| Resistor 47 | 10,000 ohms. |
| Transistor 45 | Motorola type XN2. |
| Capacitor 49 | 1000 microfarads. |
| Resistor 53 | 2200 ohms. |
| Transistor 52 | Motorola type XN2. |
| Relay 54 | 500 ohms. |

Figure 4:
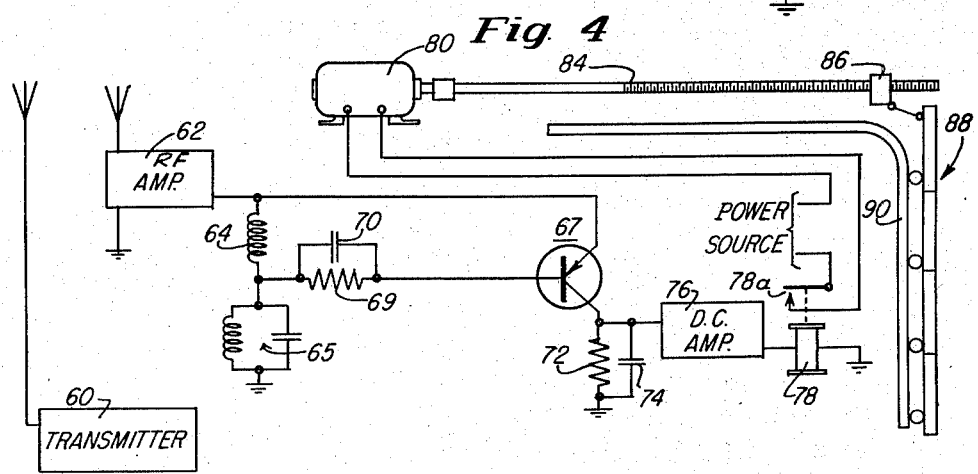
Fig. 4 is a diagram of a system utilizing the detector for control purposes.

Fig. 4 illustrates the detector circuit as used in a radio control system for operating a garage door. In this system a transmitter 60 is keyed into operation for producing a control signal of selected frequency. This transmitter may be most conveniently located in the auto of a user of the device. The signal is received by a suitable antenna and amplified in the amplifier system 62. The output of amplifier 62 is applied across the series combination of inductor 64 and the parallel coupled tuned circuit 65. Inductor 64 is connected to the emitter of transistor 67 and through the parallel combination of bias resistor 69 and bypass capacitor 70 to the base thereof. The tuned circuit 65 is also connected through the network 69—70 to the base electrode and to ground. The collector electrode of transistor 67 is coupled to ground through the parallel connection of load resistor 72 and the signal bypass capacitor 74. Signals within a very narrow frequency range to which circuit 65 is tuned will develop a voltage across load resistor 72 which is negative with respect to ground as explained in connection with the circuit of Fig. 1. Other signals including general noise signals and spurious radiation of various sorts will be primarily developed across inductor 64 and applied to the transistor in such a manner so as to be rectified and drive the base positive. This will tend to cause conduction through the collector in a manner to oppose the voltage developed across resistor 72 by the desired signal.

Accordingly, when a sufficient negative voltage appears at the top of resistor 72 to be amplified by the direct current amplifier 76, relay 78 will be operated. This closes contacts 78a thereof and applies power to the motor 80 which drives the screw 84. Rotation of screw 84 will drive threaded member 86 which is coupled to the garage door 88, slidably mounted on the track 90. A suitable switch (not shown) may be positioned to be engaged by threaded member 86 to stop the operation of the motor when the door is opened and to reverse the connection to the motor so that upon further reception of a signal the mechanism will move the door to closed position. Suitable switch apparatus (also not shown) may also be provided for reestablishing the motor connections when the door is moved to closed position so that the process can be repeated.

In the circuit of Fig. 4 the values of the components of tuned circuit 65, of the inductor 64 and the resistors 69 and 72 will determine the response characteristics of the system. It may be appreciated that it is desirable for a system of this type to be responsive only to the carrier signal of proper frequency and not to other radio signals, noise signals, or other spurious signals from electrical machinery and the like. As previously pointed out in connection with the circuit of Fig. 2, the polarity of any signal developed by the detector which is outside of the given band width of the circuit will produce a voltage across resistor 72 (the detector load) which is of a polarity to which amplifier 76 is not responsive. Accordingly, it would not matter how strong such a signal might be since it would not cause operation of the system.

Figure 5:
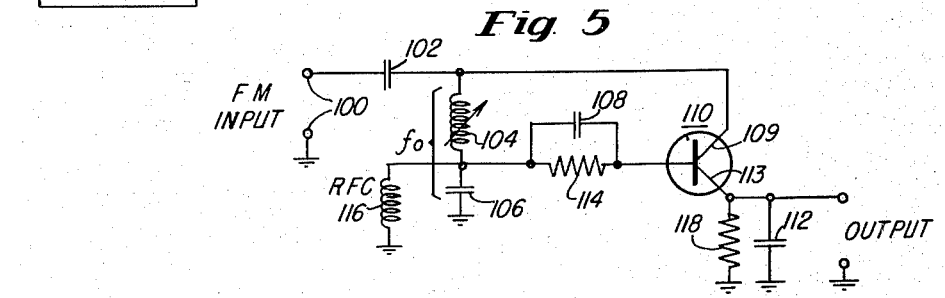
Fig. 5 is a diagram of an FM detector.

The circuit shown in Fig. 5 is a detector for frequency modulated signals. An FM input is applied to terminals 100 and this input is coupled through blocking capacitor 102 and across the series resonant circuit comprising inductor 104 and capacitor 106. This resonant circuit is tuned to the carrier frequency of the input signal. Inductor 104 is coupled through bypass capacitor 108 to the base of transistor 110 and to a further electrode 109 thereof. Capacitor 106 is also coupled through bypass capacitor 108 to the base and through bypass capacitor 112 to electrode 113 of the transistor. Resistor 114, coupled across capacitor 108, provides bias for the base as previously described and a radio frequency yoke 116 coupled from the interconnection of inductor 104 and capacitor 106 to ground, provides a D.C. path from the base of the transistor. The output of the detector is developed across resistor 118 coupled between electrode 113 and ground.

Figure 6:
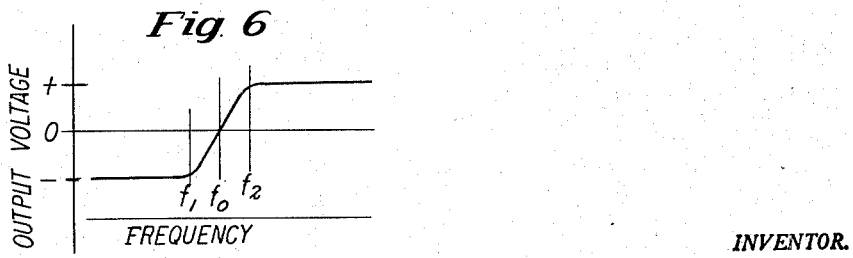
Fig. 6 is a graph useful in explaining the circuit of Fig. 5.

Fig. 6 is a curve showing the frequency $F_0$ to which circuit 104, 106 is tuned and the resulting slope which permits detection by the transistor 110. It may be noted that as the instantaneous frequency increases, a greater signal will be applied between base and electrode 109 than between the base and electrode 113, resulting in an output of given polarity. Conversely when the instantaneous frequency of the applied signal decreases, a greater signal will be applied between base and electrode 113 so that a signal of opposite polarity will be developed at the output. In this FM detector circuit it may be appreciated that there can be very little recovery of any adjacent channel signals because the curve is essentially flat on either side of the slope through $F_0$ (below $f_1$ and above $f_2$). Furthermore, the circuit uses but a single transistor, and temperature effects can be minimized over such effects in a circuit utilizing two separate diodes where balancing of the separate units may not be possible. It may also be seen that the circuit does not require critical inductive coupling as is frequently necessary in phase discriminators of other types.

The detector of the present invention provides a very simple circuit which may be inexpensively constructed. The circuit requires but few components that can be compactly assembled. Furthermore, the detector has very desirable response characteristics whereby adjacent signals are rejected.

I claim:

1. A detector circuit including in combination, signal input means for providing input signals in a given range of input frequencies, first and second impedance means having substantial but different impedances in said given range of input frequencies, said first and second impedance means being series connected and having a direct current path therethrough, a transistor having a base electrode and first and second further electrodes, direct current conducting circuit means coupling said first impedance means across said base and first electrodes and said second impedance means across said base and second electrodes, said direct current conducting means including an output load impedance connected in a series conduction path with said first and second electrodes, said signal input means being coupled to said first and second impedance means to apply input signals thereto for developing a first alternating current signal across said first impedance means and a second alternating current signal across said second impedance means, neither of said impedance means being by-passed for said input frequencies so that said first and second alternating current signals developed therein both vary with frequency and vary with respect to each other, whereby corresponding variations of said first and second signals at said first and second electrodes tend to cause conduction in opposite directions between said first and second electrodes and through said load impedance to produce a net output thereacross in response to the input signals.

2. A detector circuit including in combination, signal input means for providing input signals in a given range of input frequencies, first and second impedance means having substantial but different impedances in said given range of input frequencies, said first and second impedance means being series connected and having a direct current path therethrough, a transistor having a base electrode and emitter and collector electrodes, direct current conducting circuit means coupling said first impedance means across said base and emitter electrodes and said second impedance means across said base and collector electrodes, said direct current conducting means including an output load impedance by-passed for the input frequencies and connected in a series conduction path with said emitter and collector electrodes, said signal input means being coupled to said first and second impedance means to apply input signals thereto for developing a first alternating current signal across said first impedance means and a second alternating current signal across said second impedance means, neither of said impedance means being by-passed for said input frequencies so that said first and second alternating current signals developed therein both vary with the input signals and vary with respect to each other, whereby corresponding variations of said first and second signals at said first and second electrodes tend to cause conduction in opposite directions between said emitter and collector electrodes and through said load impedance to produce a net output thereacross in response to the input signals.

3. A detector circuit including in combination, first and second series connected impedance means having a direct current path therethrough, a transistor having a base electrode and first and second further electrodes, direct current conducting circuit means coupling said first impedance means across said base and first electrodes and said second impedance means across said base and second electrodes, said direct current conducting means including an output load impedance connected in a series conduction path with said first and second electrodes, signal input means coupled to said first and second impedance means to apply input signals thereto for providing a first signal across said first impedance means and a second signal across said second impedance means, said signal input means and said first and second impedance means having characteristics such that said first and second signals both vary in response to the input signals and vary with respect to each other, and bias developing means including a resistor coupled between said base electrode and the interconnection of said series connected impedance means, whereby corresponding variations of said first and second signals at said first and second electrodes tend to cause conduction in opposite directions between said first and second electrodes and through said load impedance to produce a net output thereacross in response to the input signals.

4. A detector circuit including in combination, first and second series connected impedance means having a direct current path therethrough, one of said impedance means comprising a parallel tuned circuit, a transistor having a base electrode and emitter and collector electrodes, direct current conducting circuit means coupling said first impedance means across said base and emitter electrodes and said second impedance means across said base and collector electrodes, said direct current conducting means including a by-passed output load impedance connected in a series conduction path with said emitter and collector electrodes, signal input means coupled to said first and second impedance means to apply input signals thereto for providing a first signal component across said first impedance means and a second signal component across said second impedance means, said signal input means and said first and second impedance means having characteristics such that said first and second signal components vary in amplitude in response to the input signals and vary in amplitude with respect to each other, and bias developing means including a resistor coupled between said base electrode and the interconnection of said series connected impedance means, whereby corresponding variations of said first and second signal components at said emitter and collector electrodes tend to cause conduction in opposite directions between said emitter and collector electrodes and through said load impedance to produce a net output thereacross in response to the input signals.

5. A detector circuit including in combination, first and second series connected impedance means having a direct current path therethrough, a transistor having a base electrode and first and second further electrodes, direct current conducting circuit means coupling said first impedance means across said base and first electrodes and said second impedance means across said base and second electrodes, said direct current conducting means including an output load impedance connected in a series conduction path with said first and second electrodes, signal input means coupled to said first and second impedance means to apply input signals thereto for providing a first signal component across said first impedance means and a second signal component across said second impedance means, said signal input means and said first and second impedance means having characteristics such that said first and second signal components both vary in response to the input signals and vary with respect to each other, and bias developing means including a resistor and a bypass capacitor parallel connected therewith coupled between said base electrode and the interconnection of said series connected impedance means, whereby corresponding variations of said first and second signal components at said first and second electrodes tend to cause conduction in opposite directions between said first and second electrodes and through said load impedance to produce a net output thereacross in response to the input signals.

6. A detector circuit including in combination, first and second series connected impedance means having a direct current path therethrough, a transistor having a base electrode and first and second further electrodes, direct current conducting circuit means coupling said first impedance means across said base and first electrodes and said second impedance means across said base and second electrodes, said direct current conducting means including an output load impedance connected in a series conduction path with said first and second electrodes, signal input means coupled to said first and second impedance means to apply frequency modulated input signals thereto for providing a first signal across said first impedance means and a second signal across said second impedance means, said first impedance means including capacitor means and said second impedance means including inductor means tuned with said capacitor means to the input signals such that said first and second signals both vary in response to the input signals and vary with respect to each other, and bias developing means including a resistor coupled between said base electrode and the interconnection of said series connected impedance means, whereby corresponding variations of said first and second signals at said first and second electrodes tend to cause conduction in opposite directions between said first and second electrodes and through said load impedance to produce a net output thereacross in response to the input signals.

7. A detector circuit including in combination, first and second series connected impedance means having a direct current path therethrough, a transistor having a base electrode and first and second further electrodes, direct current conducting circuit means coupling said first impedance means across said base and first electrodes and said second impedance means across said base and second electrodes, said direct current conducting means including an output load impedance connected in a series conduction path with said first and second electrodes, signal input means coupled to said first and second impedance means to apply input signals thereto for providing a first signal across said first impedance means and a second signal across said second impedance means, said first impedance means comprising a parallel tuned circuit tuned to the input signals and said second impedance means comprising an untuned impedance such that said first and second signals both vary in response to the input signals and vary with respect to each other, and bias developing means including a resistor coupled between said base electrode and the interconnection of said series connected impedance means, whereby corresponding variations of said first and second signals at said first and second electrodes tend to cause conduction in opposite directions between said first and second electrodes and through said load impedance to produce a net output thereacross in response to the input signals.

References Cited in the file of this patent

UNITED STATES PATENTS

| | | |
|---|---|---|
| 2,190,319 | Koch | Feb. 19, 1940 |
| 2,296,091 | Crosby | Sept. 15, 1942 |
| 2,579,336 | Rack | Dec. 18, 1951 |
| 2,681,996 | Wallace | June 22, 1954 |
| 2,777,057 | Pankove | Jan. 8, 1957 |

FOREIGN PATENTS

| | | |
|---|---|---|
| 162,946 | Australia | Aug. 27, 1953 |